(12) United States Patent
Lille

(10) Patent No.: US 6,578,816 B1
(45) Date of Patent: Jun. 17, 2003

(54) ACTIVE MICROMECHANICAL AIR VALVE FOR PRESSURE CONTROL AND METHOD FOR MAKING SAME

(75) Inventor: Jeffrey S. Lille, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/549,259

(22) Filed: Apr. 14, 2000

(51) Int. Cl.[7] .................. F16K 31/00; F16K 31/18; F16K 31/02
(52) U.S. Cl. ..................... 251/11; 251/129.01
(58) Field of Search ............... 251/11, 129.01, 251/129.06

(56) References Cited

U.S. PATENT DOCUMENTS 5,954,079 A * 9/1999 Barth et al. ............ 137/13
5,984,257 A * 11/1999 Baek et al. ............ 251/11
6,120,002 A * 9/2000 Biegelsen et al. ...... 251/129.01
6,126,140 A * 10/2000 Johnson et al. ........ 251/129.01

OTHER PUBLICATIONS

S. Leclerc et al., J. Vac. Sci. Technol. A 16(2), Mar./Apr. 1998, pp. 881–884.
W. K. Schomburg et al., J. Micromech. Microeng. 2, (1992), pp. 184–186.

* cited by examiner

Primary Examiner—Edward K. Look
Assistant Examiner—John K Fristor, Jr.
(74) Attorney, Agent, or Firm—Altera Law Group, LLC (57) ABSTRACT

An active micromechanical air valve for pressure control in a disk drive and method for making the same is disclosed. A first layer having a first thermal coefficient of expansion and a second layer having a second thermal coefficient of expansion are formed. The first layer and the second layer are configured to form a membrane. The first and second layer engage in a closed state to prevent air flow there between in a first thermal state and open to allow air flow there between in a second thermal state.

10 Claims, 12 Drawing Sheets fig. 1

ACTIVE MICROMECHANICAL AIR VALVE FOR PRESSURE CONTROL AND METHOD FOR MAKING SAME

BACKGROUND OF THE INVENTION

1. Field of the Invention

This invention relates in general to a direct access storage device (DASD), and more particularly to an active micromechanical air valve for providing pressure control and method for making the same.

2. Description of Related Art

Conventional magnetic storage devices include a magnetic transducer or "head" suspended in close proximity to a recording medium, e.g., a magnetic disk having a plurality of concentric tracks. The transducer is supported by an air bearing slider mounted to a flexible suspension. The suspension, in turn, is attached to a positioning actuator. During normal operation, relative motion is provided between the head and the recording medium as the actuator dynamically positions the head over a desired track. The relative movement provides an air flow along the surface of the slider facing the medium, creating a lifting force. The lifting force is counterbalanced by a predetermined suspension load so that the slider is supported on a cushion of air. Air flow enters the leading edge of the slider and exits from the trailing end. The head resides toward the trailing end, which tends to fly closer to the recording surface than the leading edge.

The recording medium holds information encoded in the form of magnetic transitions. The information capacity, or areal density, of the medium is determined by the transducer's ability to sense and write distinguishable transitions. An important factor affecting areal density is the distance between the transducer and the recording surface, referred to as the fly height. It is desirable to fly the transducer very close to the medium to enhance transition detection. Some fly height stability is achieved with proper suspension loading and by shaping the air bearing slider surface (ABS) for desirable aerodynamic characteristics.

Under some circumstances it is desirable to change the flying height of the slider holding the magnetic recording head in a disk drive. One primary reason is that the areal density of data can be increased when the recording head is close to the disk surface. That is because magnetic recording is a "near-field" process; in other words, writing by the write head and reading by the read head occur in close proximity to the disk. This leads to an exponential dependence of the field on the spacing between the head and disk and, consequently, areal density.

Hard drive manufactures are starting to incorporate proximity recording type sliders in drives in order to achieve higher storage densities. The proximity recording slider is designed to maintain a small area near the read-write element in constant contact or near-contact with the disk, and thus enabling smaller bit size and ultimately larger storage densities.

This approach to increasing storage density puts considerable amount of strain on controlling wear at the slider-disk interface, because a slight variation in contact load and contact area could greatly affect the drive survivability. Slider-disk contact results in lubricant depletion and degradation, wear of both surfaces, generation of wear particles, stick-slip, etc. All these phenomena affect magnetic performance of the disk drive, e.g., through jitter, as well as its durability. Nevertheless, as mentioned above, a contact slider is key for high-density magnetic recording.

Thus, maintaining a stable and reliable interface is required to ensure proper functioning of a disk drive. For example, if the spacing between a write head and the magnetic disk is too large, the head's fringing field will be too weak to record data on the disk. Also, the read-back signal registered by a read head (usually, a magnetoresistive head integrated with the write head) will be reduced and data errors may occur. On the other hand, very low head-disk spacing may improve magnetic performance, but can lead to mechanical wear of the head and disk, substantially reducing the lifetime of both.

Of course, as areal density of data increases, the tolerances in the head-disk spacing or the flying height must be reduced. This places significant constraints on both head and disk parameters. Since typical disks can be out of flatness by as much as 20–50 nm (nanometers) and the slider flies at a height of less than 30 nm the compliance of the head and suspension must be sufficient to compensate for this large motion while tracking the disk surface.

The prior art air bearing technology used in disk drives offers a large number of different designs. They were developed to satisfy somewhat different criteria, and over the years they have become more elegant, with improved performance allowing decreased head-disk spacing. Some of the requirements for specific air bearing designs include rapid take-off, close compliance to the disk's surface, stable flying and minimal variation of flying height of the slider at different radial positions on the disk. The last item is important since the relative velocity of the head over the disk can change by as much as a factor of 2 from the inside to the outside diameter of a typical magnetic recording disk. The different velocities alter the air pressure under the slider and result in changes in flying heights than can impact the head's ability to read and write properly. Changes in ambient pressure also affect the flying height. Thus, the flying height in a disk drive operating in a low pressure environment, e.g., on-board an airplane, is different than the flying height in a disk drive operating at standard atmospheric pressure. Finally, with the widespread use of rotary actuators in disk drives, the air bearing must be able to fly in a stable manner over a range of azimuthal orientations (20–25 degrees) of the head with respect to the disk.

As can be seen, the fly height spacing control for a read/write element is a critical parameter in a hard disk storage device. A near contact spacing gap during writing and reading would greatly enhance the signal to noise ratio and allow the increase to higher Arial bit densities. However, a constant near contact fly height would have greater wear and tribologic effects between the head and the disk over time. It would be desirable to limit the contact to the times when recording is taking place while maintaining a low flying height, e.g., on the order of 5–50 nm at all other times.

The ability to have the head contact the disk surface-on-demand (SOD) with minimal impact to current head manufacturing is desirable. The majority of the time, the slider is neither reading nor writing on a disk. Accordingly, the head can be flown higher during this inactive time to provide greater spacing between the head and the disk to minimize wear. Previous work have sought to achieve this by building a member that deforms the trailing edge of the slider.

Other changes to the fly height can be accomplished through changing the pressure inside the drive enclosure. A portion of the air would be pumped out of the drive through a valve. This valve would maintain a sub-ambient pressure for the drive to operate.

W. K. Schomburg disclose in the Journal of Micromechanical Microengineering, 2, 184 (1992), a large, passive air valve for use as a pressure release valve. The Schomburg structure requires a 450° C. anneal to relieve stress in the stiff bridge material which was made of titanium. Because this similar valve is passive and is hundreds of microns in diameter, a large differential pressure is required to actuate the valve. In addition, the valve would take many seconds for a measurable pressure change between the two sides of the membrane to occur.

Moreover, the head environment demands much more stringent scaling requirements and temperature limits during the processing of the head. For example, in order to prevent alteration of the read element, a 200° C. thermal budget is imposed. Moreover, an active valve is required to accomplish the goals of controlling the fly height of a head.

It can be seen that there is a need for an active micromechanical air valve for fly height control of an air bearing slider and method for making the same.

It can also be seen that there is a need for an active micromechanical air valve that meets the processing requirements of head production processes as well as the scaling requirements.

SUMMARY OF THE INVENTION

To overcome the limitations in the prior art described above, and to overcome other limitations that will become apparent upon reading and understanding the present specification, the present invention discloses an active micromechanical air valve for air bearing surface pressure control of an air bearing slider and method for making the same.

The present invention solves the above-described problems by providing a micromechanical air valve that will control the air flow to the ABS or air flow to/from the drive enclosure, thus altering the fly height. When the valve is activated, air can pass through a valve and down etched air tubes that are open to the ABS.

An active micromechanical air valve for a disk drive in accordance with the principles of the present invention includes a first layer having a first thermal coefficient of expansion, a second layer having a second thermal coefficient of expansion, wherein the first layer and the second layer are configured to form a membrane, the first and second layer engaging in a closed state to prevent air flow there between in a first thermal state and opening to allow air flow there between in a second thermal state.

Other embodiments of an active micromechanical air valve in accordance with the principles of the invention may include alternative or optional additional aspects. One such aspect of the present invention is that the first thermal state is achieved by the absence of a control signal.

Another aspect of the present invention is that the control signal is a drive current from a current source.

Another aspect of the present invention is that the second thermal state is achieved by application of a control signal.

Another aspect of the present invention is that the control signal is a drive current from a current source.

Another aspect of the present invention is that the first layer is a conductive layer forming a bridge layer for conducting a drive current applied to the conductive layer.

Another aspect of the present invention is that the first layer further includes a nickel bridge.

Another aspect of the present invention is that the nickel bridge further includes a resistive, low stress insulating material sputtered thereon and a doped layer of polycrystalline silicon for providing an electrical resistive layer.

Another aspect of the present invention is that the second layer further includes a thermal expansive polymer.

Another aspect of the present invention is that the second layer further includes a first opening and a downward facing member and the first layer includes a second opening, the second opening of the first layer offset from the first opening in the second layer and the downward facing member plugging the second opening in the first layer when the first and second layer engage in the closed state to prevent air flow there between in the first thermal state.

In another embodiment of the present invention, a head for use in a disk drive is provided. The head includes a slider, a transducer formed on the slider, air tubes formed through the slider form the air bearing surface, a well formed at the back end of the slider, at least one air tube formed through the slider from the air bearing surface to the well for providing an air flow path from the air bearing surface of the slider to the back end of the slider and an active micromechanical air valve for fly height control of the head, including a first layer having a first thermal coefficient of expansion, a second layer having a second thermal coefficient of expansion, wherein the first layer and the second layer are configured to form a membrane, the first and second layer engaging in a closed state to prevent air flow there between in a first thermal state and opening to allow air flow between the air bearing surface and the membrane in a second thermal state.

In another embodiment of the present invention, a disk drive is provided. The disk drive includes at least one rotating disk for recording data, a housing, the rotatable disk being rotatably attached to the housing, an actuator arm assembly, coupled to the housing and at least one head, coupled to the actuator arm assembly, the at least one head writing and reading data to and from the at least one rotating disk, the at least one head, including a slider, a transducer formed on the slider, air tubes formed through the slider form the air bearing surface, a well formed at the back end of the slider, at least one air tube formed through the slider from the air bearing surface to the well for providing an air flow path from the air bearing surface of the slider to the back end of the slider and an active micromechanical air valve for fly height control of the head, including a first layer having a first thermal coefficient of expansion, a second layer having a second thermal coefficient of expansion, wherein the first layer and the second layer are configured to form a membrane, the first and second layer engaging in a closed state to prevent air flow there between in a first thermal state and opening to allow air flow between the air bearing surface and the membrane in a second thermal state.

In another embodiment of the present invention, a method of forming an active micromechanical air valve for fly height control of an air bearing slider is provided. The method includes forming a first layer having a first thermal coefficient of expansion, forming a second layer over the first layer having a second thermal coefficient of expansion, wherein the first layer and second layer are configured to form a membrane, the first and second layer engaging in a closed state to prevent air flow there between in a first thermal state and opening to allow air flow there between in a second thermal state.

In another embodiment, a valve may also be applied to an outer surface of the disk enclosure. This surface may also be to an intermediate chamber(s) attached to the outside of the disk enclosure. The use of a valve discussed herein can be used to regulate a pressure difference between the inside and outside of the disk drive.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 2a is an isometric view of an air bearing slider in accordance with the invention;

FIG. 2b is a view of the slider along line A—A showing the via head-on;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an active micromechanical air valve for providing pressure control and method for making the same. The micromechanical air valve can be used to control the air flow to the ABS, thus altering the fly height. Another use is to control the air flow between the inside and ambient environment. An active micromechanical air valve for fly height control of an air bearing slider and method for making the same is disclosed. A first layer having a first thermal coefficient of expansion and a second layer having a second thermal coefficient of expansion are formed. The first layer and the second layer are configured to form a membrane. The first and second layer engage in a closed state to prevent air flow there between in a first thermal state and open to allow air flow there between in a second thermal state.

Figure 1:
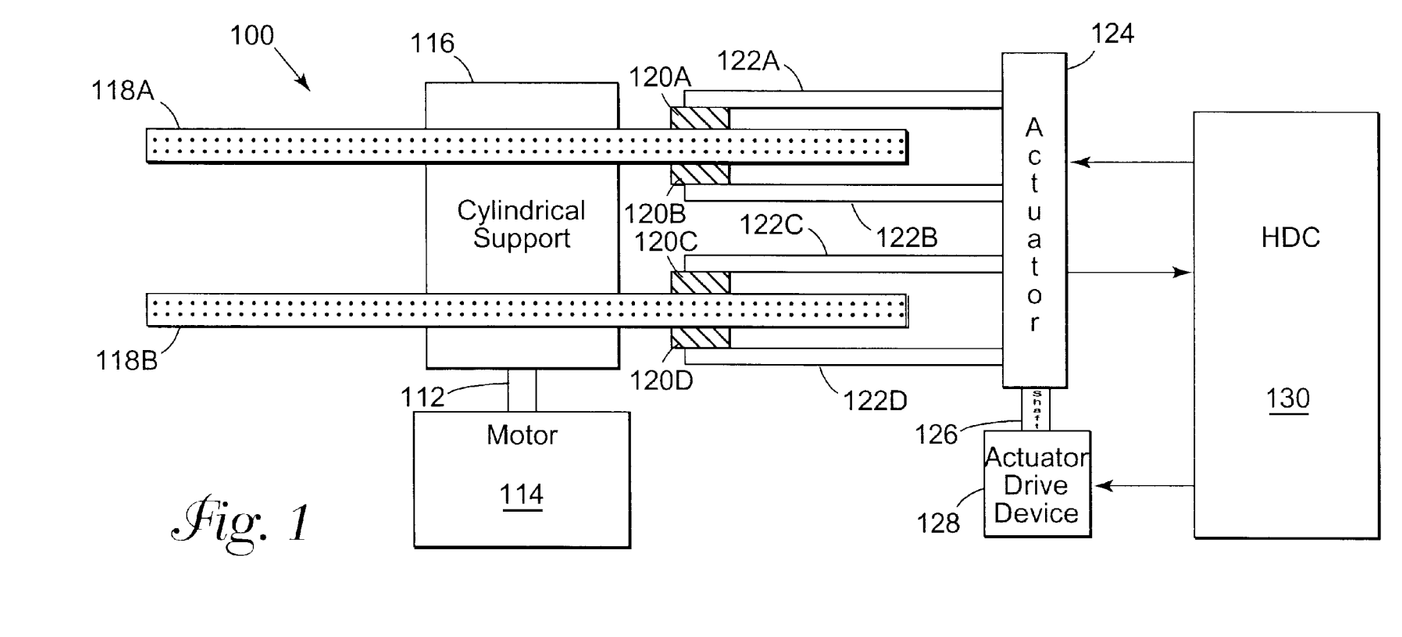
FIG. 1 illustrates a hard disk drive (HDD) including disks according to the present invention.

FIG. 1 illustrates a hard disk drive (HDD) 100 including disks 118A, 118B according to the present invention. The HDD 100 includes a disk 118 and a hard disk controller (hereinafter referred to as HDC) 130. The disk part has a motor 114 for rotating a shaft 112 at a high speed. A cylindrical support 116 is attached to the shaft 112 so that the their axes are in coincidence. One or more information recording disks 118A and 118B are mounted between support 116. Magnetic heads 120A, 120B, 120C and 120D are respectively provided to face the disk surface, and these magnetic heads are supported from an actuator 124 by access arms 122A, 122B, 122C, and 122D, respectively. The individual magnetic heads 120A to 120D receive the drive force transmitted from an actuator drive device 128 by a shaft 126 and rotates about the shaft 126 as the axis of rotation, and fly over the disk 118 to a predetermined position.

Figures 2A, 2B:
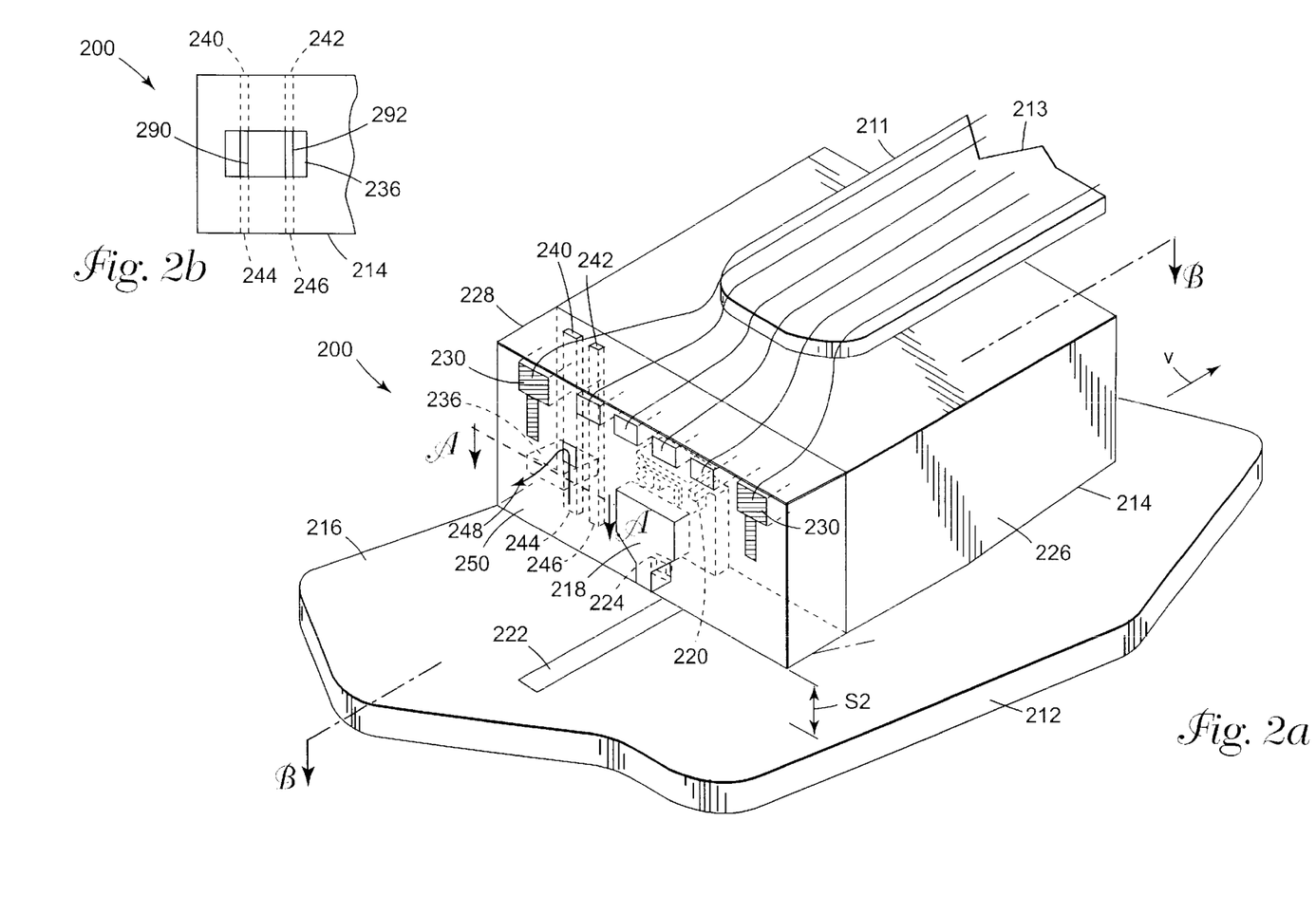

FIG. 2a is an isometric view of an air bearing slider 200 in accordance with the invention. Slider 200 is mounted at the end of an actuator arm 213, or, more precisely, on suspension 211 terminating arm 213. Slider 200 is positioned above a recording medium 212, in this case a magnetic disk, such that an air bearing surface 214 of slider 200 faces a disk surface 216. Slider 200 has a magnetic recording or write head 218 with a coil 220 for recording data on a track 222 of disk 212. The reading of data is accomplished by a read head 224, e.g., a magnetoresistive (MR) head, a giant magnetoresistive (GMR) head, a tunnel sensing head or any other suitable reading head integrated with the recording head 218, as is known in the art.

The writing of data in track 222 is a near-field process requiring head tip 224 to be in close proximity to track 222. Thus, head tip 224 is located at a flying height S2 above track 222 as slider 20 flies above disk 212.

Slider 200 has a body 226 which is attached to suspension 211 on arm 213, and a back portion 228 which contains head 218. In fact, body 226 is preferably a substrate (e.g., a ceramic substrate) on which back portion 228 is fabricated.

A number of studs or bonding pads 230 are patterned in back portion 228. Studs 230 are provided for making the necessary electrical connections to write head 218 and to read head 224 as well as any other components, e.g., sensors (not shown) mounted on slider 200. Additionally, pins 230 may are be used for making electrical connections to a micromechanical air valve (not shown) that may are mounted on a back surface 250 of back portion 228 of slider 200. Slider 200 is constructed in such a way that back surface 250 is nearly perpendicular to or exactly perpendicular air bearing surface 214 at back portion 228.

Outlet 236 is coupled to ducts 240, 242 to provide a passageway for air through the ducts 240, 242. Ducts 240, 242 have inlets 244, 246 at air bearing surface 214 of slider 200. As disk 212 rotates slider 210 flies above it at a relative velocity v and air enters ducts 240, 242 through inlets 244, 246. When the micromechanical air valve (not shown) is open, air flow 248 enters duct 240 through inlet 244 and passes out through outlet 236. Those skilled in the art will recognize that the present invention is not meant to be limited to the number of ducts, such as ducts 240, 242, and the number of vias 236 shown in FIG. 2. Rather, the present invention may comprise a plurality of vias with each coupled to any number of ducts.

FIG. 2b is a view of the slider 200 along line A—A showing the via head-on. As shown in FIG. 2b, the slider 200 includes via 236 that is coupled to ducts 240, 242 to provide a passageway for air through the ducts 240, 242. Ducts 240, 242 have inlets 244, 246 at air bearing surface 214 of slider 200. The ducts 240, 242 open into the via 236 at ports 290, 292. Therefore, air flow in the ducts 240, 242 may enter the via 236 in response to control of the micromechanical air valve (not shown).

Figure 3:
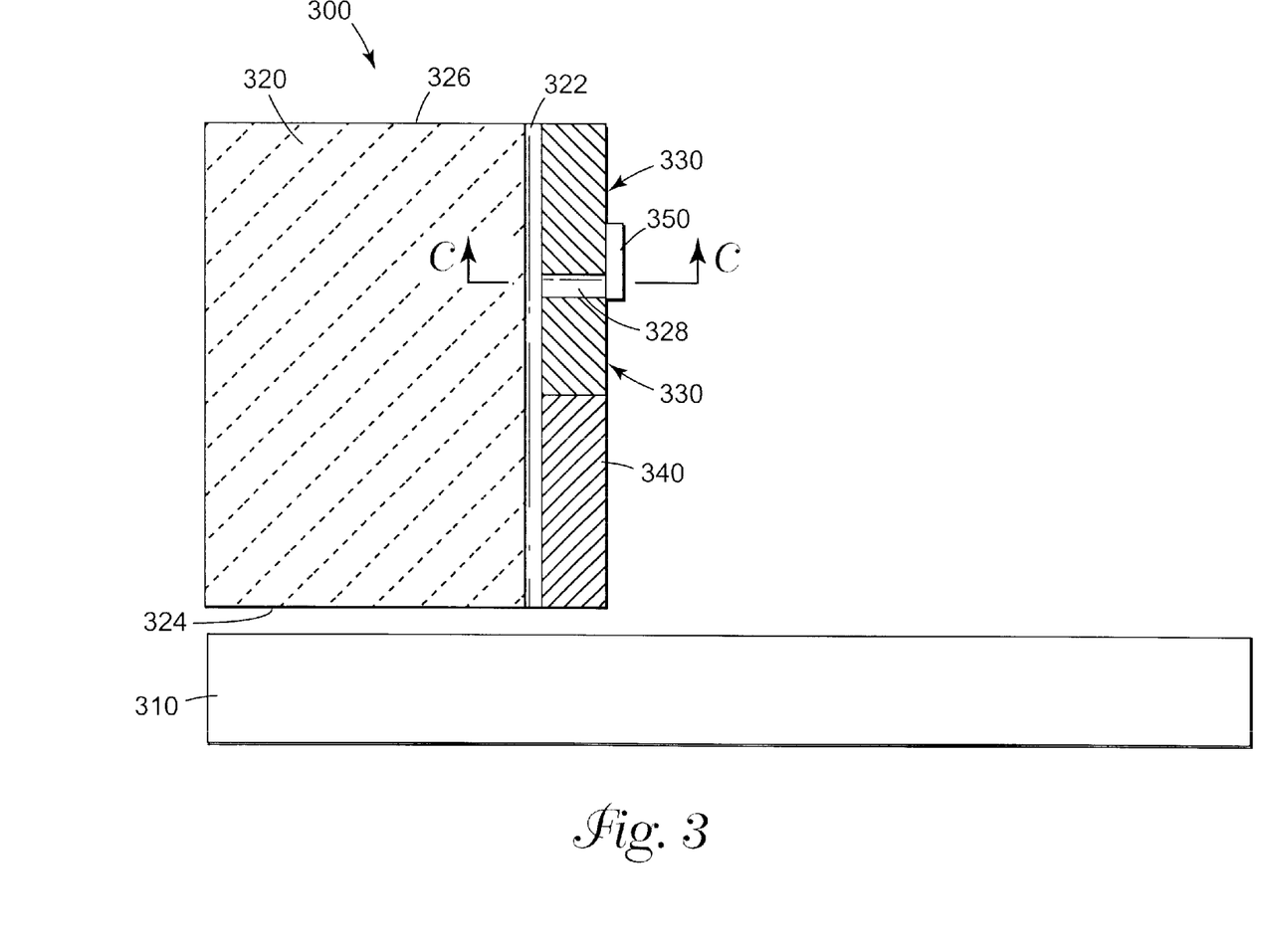
FIG. 3 is a cross sectional view along line B—B of the slider of FIG. 1.

FIG. 3 is a cross sectional view of the slider 200 along line B—B of the slider of FIG. 1. In FIG. 3 the slider 300 is shown flying above the disk 310. The slider includes a ceramic body portion 320. Air tubes 322 are shown extending from the ABS 324 to the top 326 of the slider 300. However, those skilled in the art will recognize that the air tubes 322 need not extend all the way to the top 326 of the slider 300, but instead may only extend a sufficient amount to provide a passage way to the via 328. Around the via 328, the related head structure and interconnects 330 are formed. The write and read head elements 340 are formed in a manner to be positioned near the surface of the disk 310. According to the present invention, a micromechanical air valve 350 is formed over the via to control the flow of air through the air tubes 322 and via 328. Thus, the operation of the micromechanical air valve 350 controls the fly height 360 of the slider 300 relative to the disk 310.

To actively change the pressure at the ABS 324, the micromechanical valve 350 will need to open and close on timescales measured in milliseconds. However, there are few constraints that will not allow traditional micromechanical processing techniques. One, a fragile read element 340 exists in the head. In order to prevent alteration of the read element 340, a 200 C thermal budget is imposed. Two, the chemicals used can not introduce corrosion or chemically interact with the existing structure of the slider 300. This constraint may be avoided by completing all the processing at the wafer level where the read/write element 340 is encapsulated under a protective oxide layer.

Figure 4:
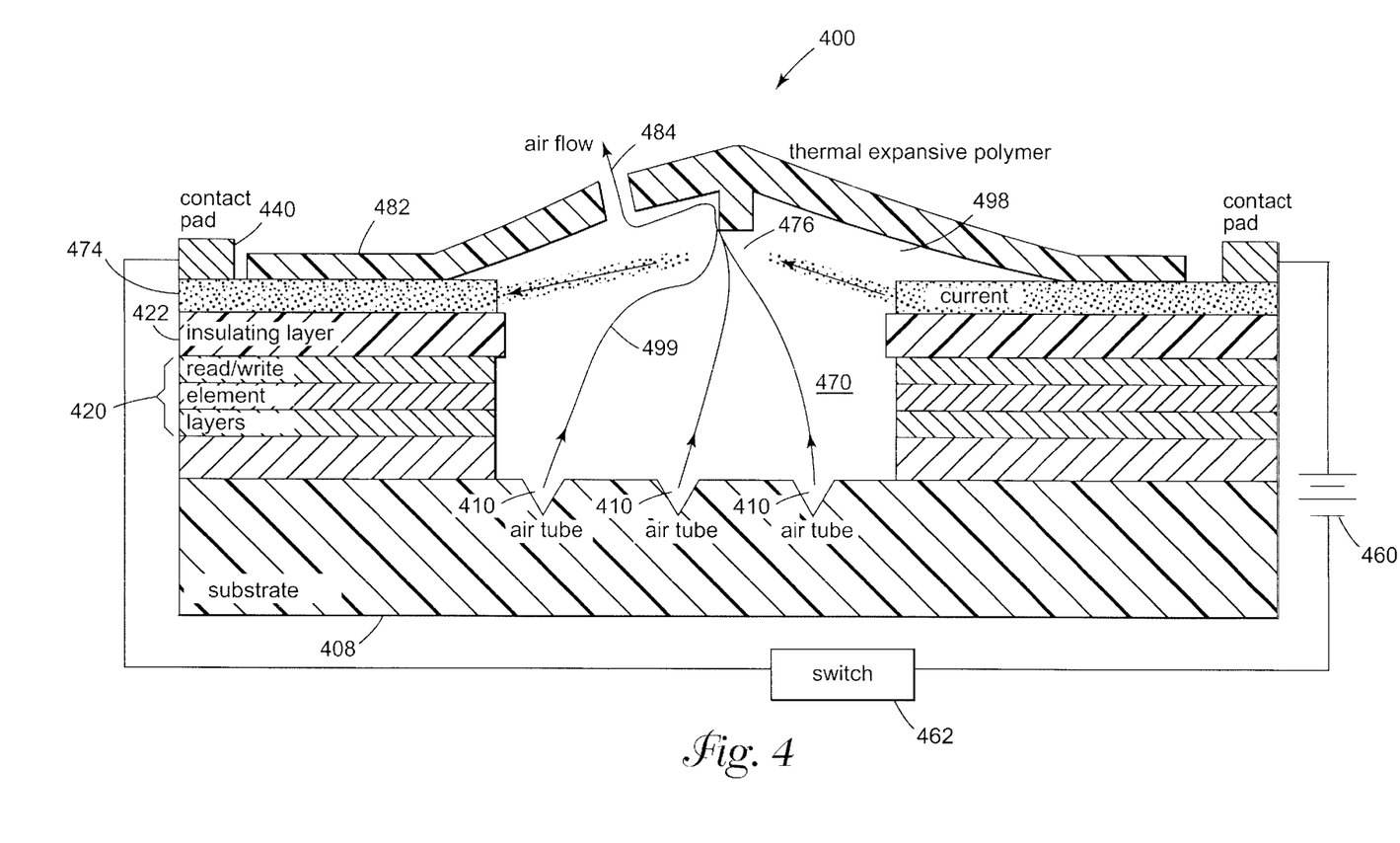
FIG. 4 is a cross sectional view of the slider 300 along line C—C of the slider of FIG. 3.

FIG. 4 is a cross sectional view 400 of the slider along line C—C of the slider of FIG. 3. In FIG. 4, the substrate 408 is shown with air tubes 410 formed therein. A plurality of layers 420 are deposited to form the read/write element layers. An insulating layer 422 is formed over the read/write element layers 420. The insulating layer 422 and read/write layers 420 form a via or well 470. Those skilled in the art will recognize that a plurality of air tubes 410 may be formed with one or more having access to the via 470.

A conductor layer forming a bridge 474 is deposited over the insulating layer 422 and a thermal expansive polymer 482 is deposited over the bridge 474. Contact pads 440 are formed at each end of the conductive bridge 474 and are connected to a current source 460 and a controller 462, e.g., a battery and a switch. When the valve is opened by application of a control signal to the contact pads 440, the thermal expansive polymer 482 moves further away from the bridge 474 so that air flow 499 passes through the air tubes 410, via 470, bridge via 476 and through void 484 in the thermal expansive polymer 482.

The basis of the microvalve 400 is a dual layer 474, 482 with a space 498 between the two layers 474, 482. One layer has a significant differential thermal expansion coefficient relative to the other layer. This valve 400 can be constructed entirely at the wafer level. An electrical current provided by current source 460 will heat one or both ends of the bridge 474 that supports the membrane 482 that covers the bridge via 476. This thermal expansion will separate the membrane 482 form the bridge 474 and cause the air to move to or from the air bearing surface as described above, thus altering the flying height.

The operation of the micromechanical air valve 400 alters the pressure at the air bearing surface of a slider. This alteration of the fly height on demand takes place during writing and/or reading, which greatly increases the signal from or to the magnetic disk and eliminates contact when the head is inactive. Those skilled in the art will recognize that the air bearing design may be chosen so that either opening or closing of the microvalve 400 will allow the head to fly closer to the disk.

The process for producing a micromechanical head according to the present invention provides several advantages. First, all the materials can be masked and deposited below a thermal budget of 200° C. Second, all the dimensions are of the scale of several (tens of) microns. This makes all the masking steps non-critical for a small error in the alignment will not drastically alter the structure or performance of the air valve 400. This makes the process inherently a very high yield process in terms of manufacturing. Third, by completely manufacturing the air valve 400 at the wafer level, there is no need to alter any processes in slider fabrication where the individual heads are separated from the wafer.

FIGS. 5–19 illustrate the process for fabricating an active micromechanical air valve for fly height control of an air bearing slider according to the present invention.

During the processing of the slider, air holes 510 are formed in the structure as shown in FIGS. 2–4. The air holes 510 are filled before any head processing by using a damascene technique to inlay a sacrificial material 512 in a canal-type structure, i.e., the air holes 510, in the substrate. The sacrificial material 512 is assumed herein to be copper. The canals 510 in the substrate 508 are in-laid into the substrate so to be perpendicular to the ABS (upon wafer dicing). A copper etch will eventually open up the air tubes to the ABS surface.

Figure 5:
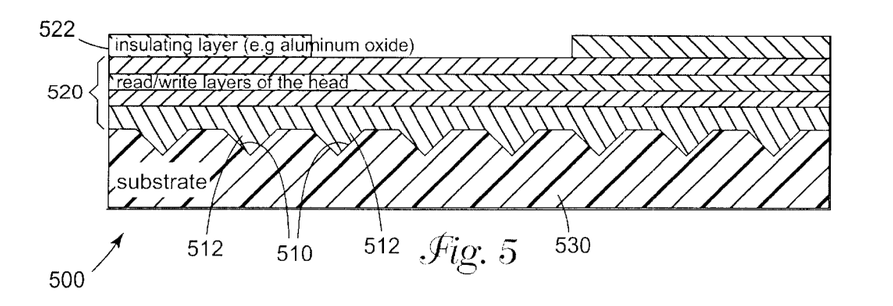
FIG. 5 illustrates the slider with the completion of the head processing and formation of the air holes.
Figure 6:
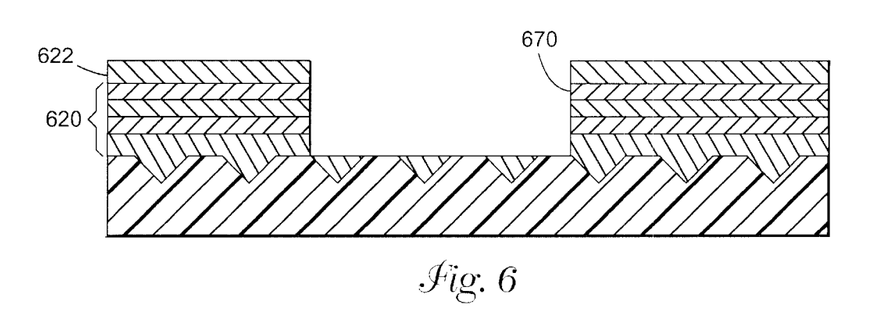
FIG. 6 illustrates the formation of a via according to the present invention.

In FIG. 5, the slider 500 is shown with the completion of the head processing and formation of the air holes 510. Thereafter, as shown in FIG. 6, a via 670 is formed. The via 670 may be created down to the air holes 610 by masked etching. Another possible design is to mask a via 670 during the previous deposition steps, i.e., during the deposition of the head layers 620 and insulation layer 622.

Figure 7:
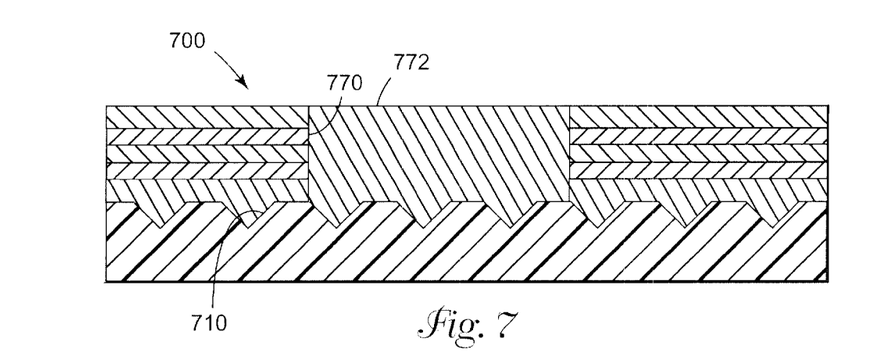
FIG. 7 illustrates the filling of the air holes and via.

FIG. 7 is a view of the slider 700 with the air holes 710 and via 770 being filled. Once the copper canals for the air tubes 710 are exposed to the top surface of the finished head, copper 772 is plated up to fill the void up to the top of the deposited layer surface. The etched via 770 is filled with a sacrificial layer material (e.g. copper) and is then planarized by a polish step.

Figure 8:
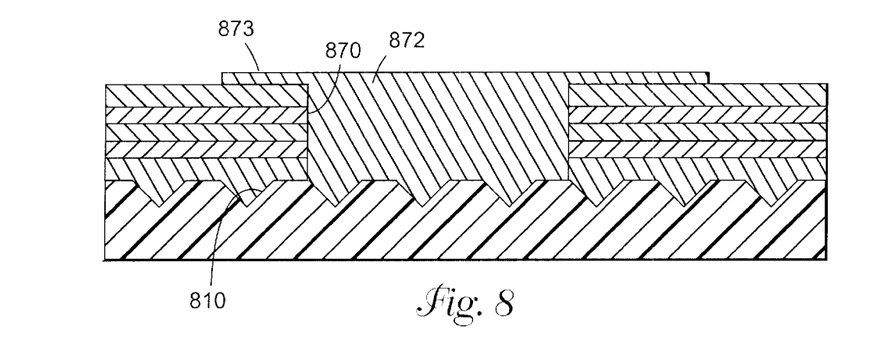
FIG. 8 illustrates a sacrificial layer deposited over the via.

FIG. 8 illustrates a first sacrificial layer 873 deposited over the via 870. According to the present invention, the via 870 is masked and deposited with a sacrificial layer 872 or a sacrificial material 872 is filled and simply masked and deposited.

Figure 9:
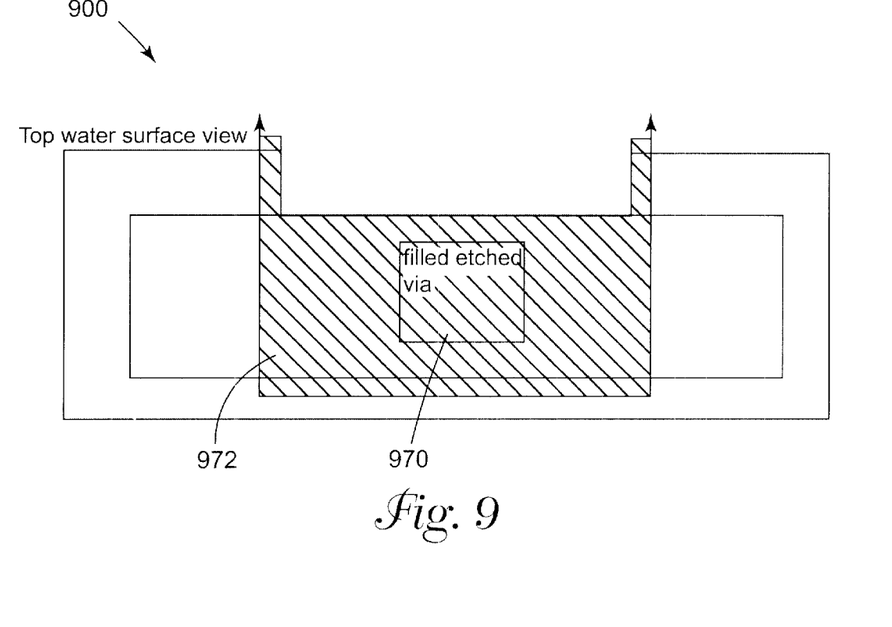
FIG. 9 illustrates a top wafer surface view of the slider.

FIG. 9 illustrates a top wafer surface view of the slider 900. The first sacrificial layer 873 extends far beyond the dimension of the via 970, e.g., to the top of the slider 900.

Figure 10:
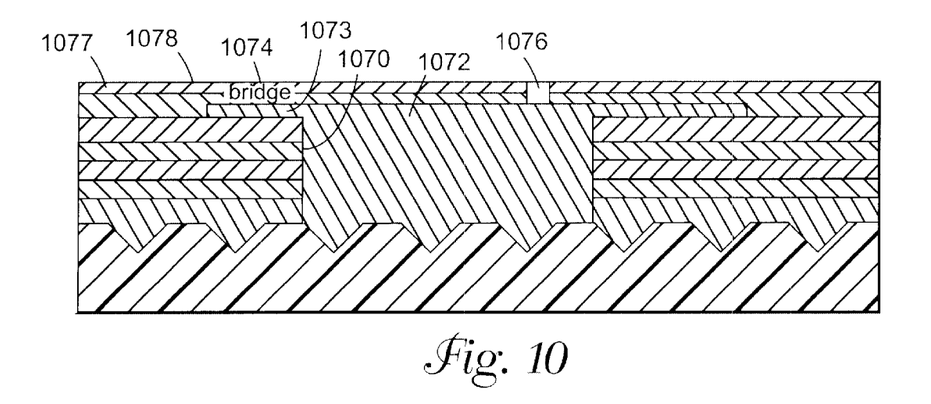
FIG. 10 illustrates the formation of a bridge over the via and sacrificial structure.

FIG. 10 illustrates the formation of a bridge 1074 over the via 1070 and first sacrificial structure 1073. The aggregate copper structure 1073 is partially covered with a stiff material that forms the bridge 1074 across the via 1070. The bridge 1074 has an opening 1076 to the copper filled via 1070. The bridge 1074 must be thick, stiff, resistant to the sacrificial layer etchant, and easily manufacturable. For example, the material for the bridge 1074 may be electroplated nickel. A thick nickel bridge 1074 satisfies all these requirements.

However, a nickel bridge 1074 will not make a good electrical resistor. To accomplish this, the plated nickel will go through an additional deposition step prior to photoresist liftoff. The plated nickel will have a resistive, low stress insulating material 1077 sputtered thereon, e.g., an insulating silicon dioxide, nickel oxide, or a low temperature deposited silicon nitride layer. Thereafter, a thin doped layer of polycrystalline silicon 1078 as the electrical resistive layer is deposited over the bridge 1074. A possible material for depositing a low stress insulating material at a low temperature is using a high density plasma to deposit silicon nitride. S. Leclerc et al. in the Journal of Vacuum Science Technology A, 16(2) 881 (1998) disclosed a process of depositing silicon nitride in an electron cyclotron resonance (ECR) plasma for micromechanical purposes. This process is used herein to form the low stress bridge layer material.

Figure 11:
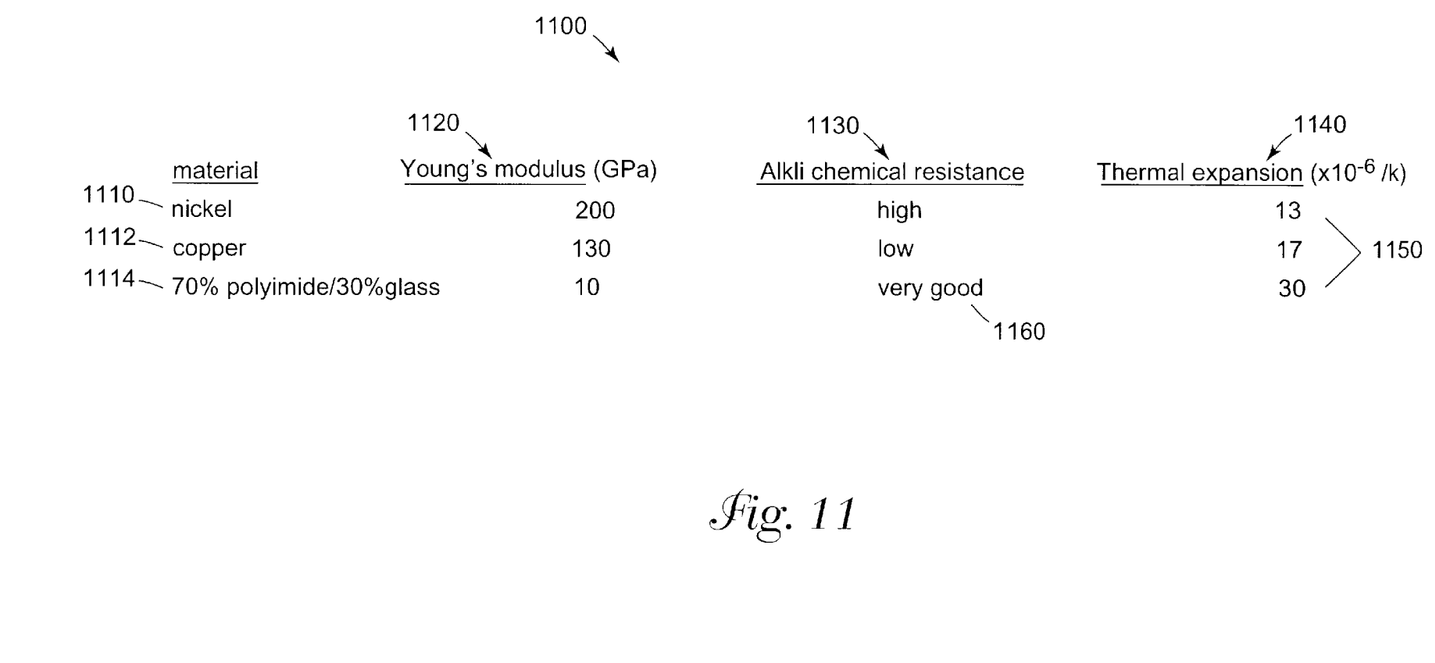
FIG. 11 illustrates a table that shows that the properties of bridge materials.

To further clarify the advantages of these materials, FIG. 11 illustrates a table 1100 that shows that the properties of bridge materials. In FIG. 11, a nickel 1110, a copper 1112 and a 70% polyimide/30% glass material 1114 are compared. The table lists the Young's modulas 1120, the Alkali chemical resistance 1130 and the thermal expansion 1140 for the three materials. From the table in FIG. 11, is clear that the polyimide expands much more than the nickel 1150, and provides bridge material that is still resistant to an alkali copper etchant 1160.

Figure 12:
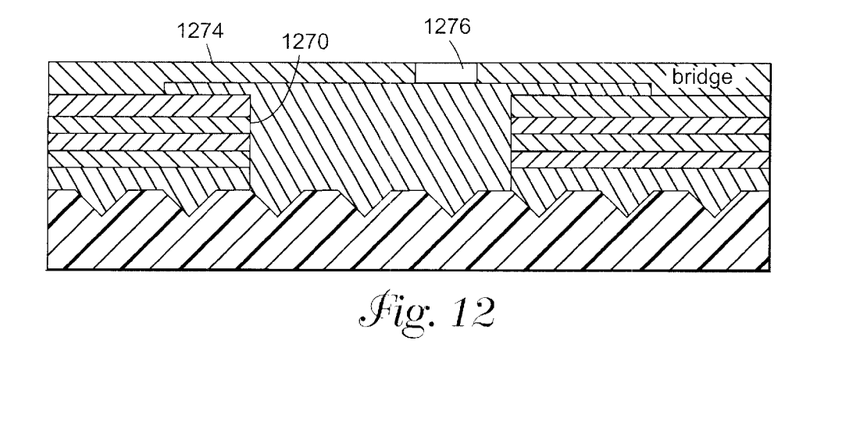
FIG. 12 illustrates the bridge having a void therein positioned over the filled via.
Figure 13:
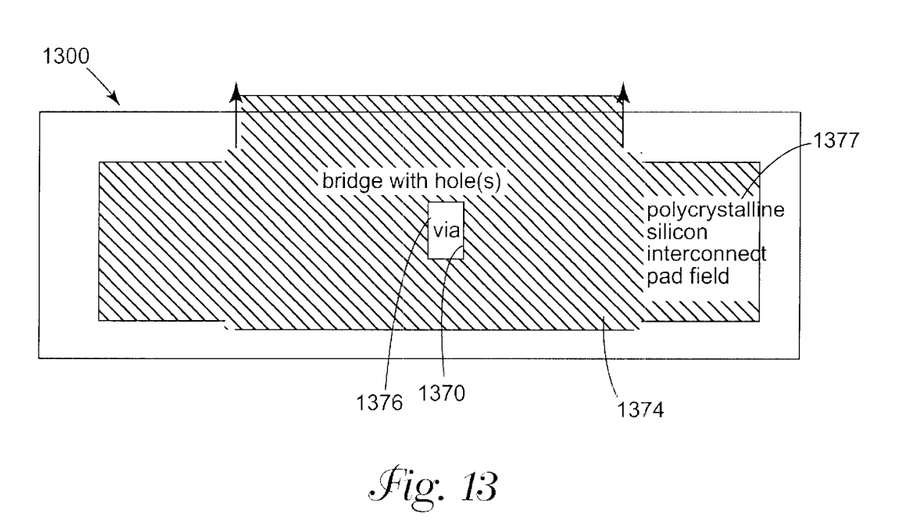
FIG. 13 is a top wafer surface view of the structure after formation of the bridge.

FIG. 12 illustrates the bridge 1274 having a void 1276 therein positioned over the filled via 1270. FIG. 13 is a top wafer surface view 1300 of the structure after formation of the bridge 1374. FIG. 13 also shows the polycrystalline silicon interconnect pad field 1377. The bridge 1374 includes a void 1376 which provides a portal to the via 1370.

Figure 14:
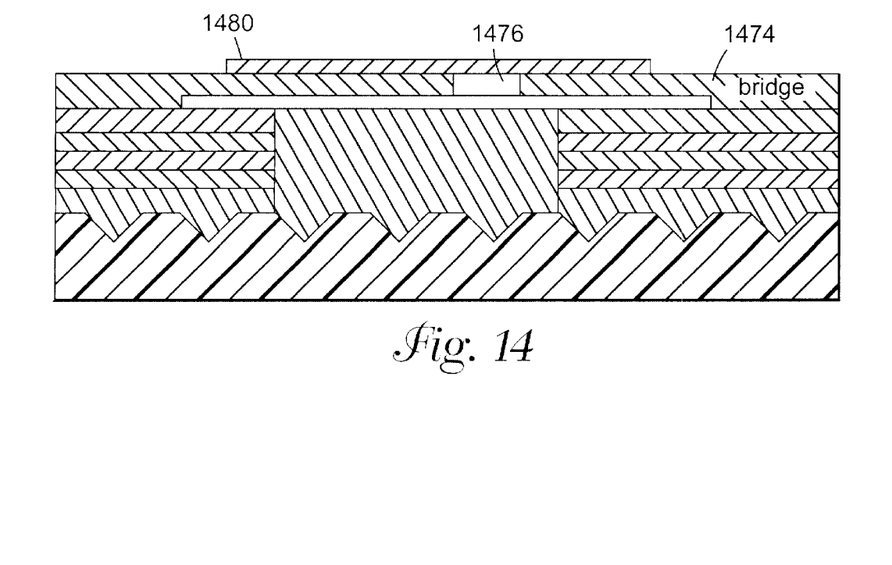
FIG. 14 illustrates the formation of a second sacrificial layer formed over the bridge and the bridge via.
Figure 15:
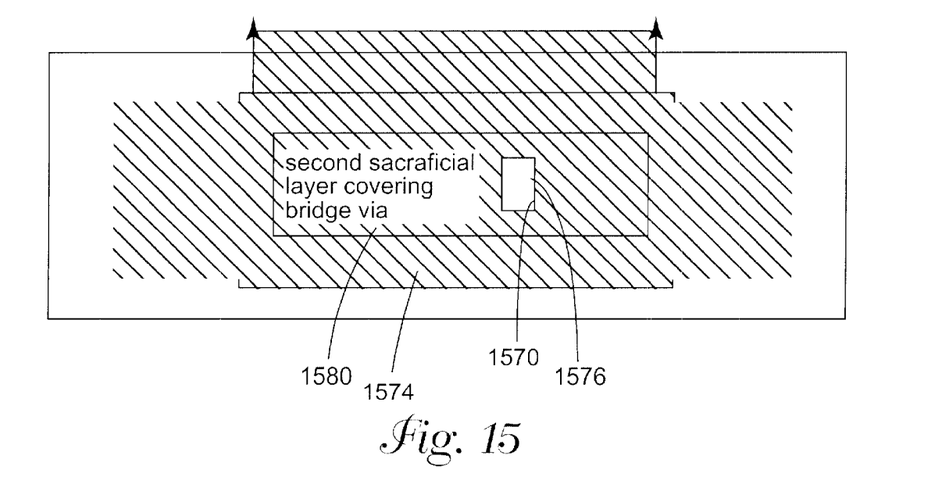
FIG. 15 illustrates a top wafer surface view of the structure after formation of the second sacrificial structure.

FIG. 14 illustrates the formation of a second sacrificial layer 1480 formed over the bridge 1474 and the bridge via 1476. FIG. 15 illustrates a top wafer surface view of the structure after formation of the second sacrificial structure 1580. The bridge 1574 includes a void 1576 which provides a portal to the via 1570.

Figure 16:
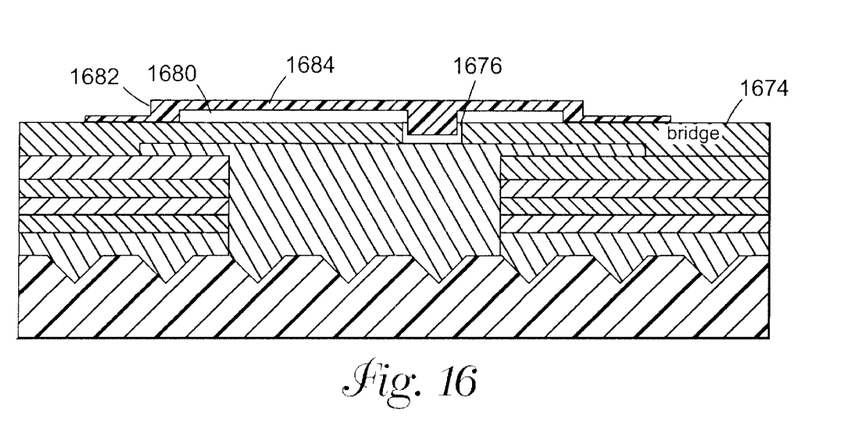
FIG. 16 illustrates the formation of the polymer membrane having a greater thermal expansion coefficient than the material comprising the bridge.

FIG. 16 illustrates the formation of the polymer membrane 1682 having a greater thermal expansion coefficient than the material comprising the bridge 1674. The polymer membrane 1682 is shown having a void 1684 formed therein that is non-overlapping the bridge via 1676. The polymer membrane 1682 is formed over the second sacrificial layer 1680.

Figure 17:
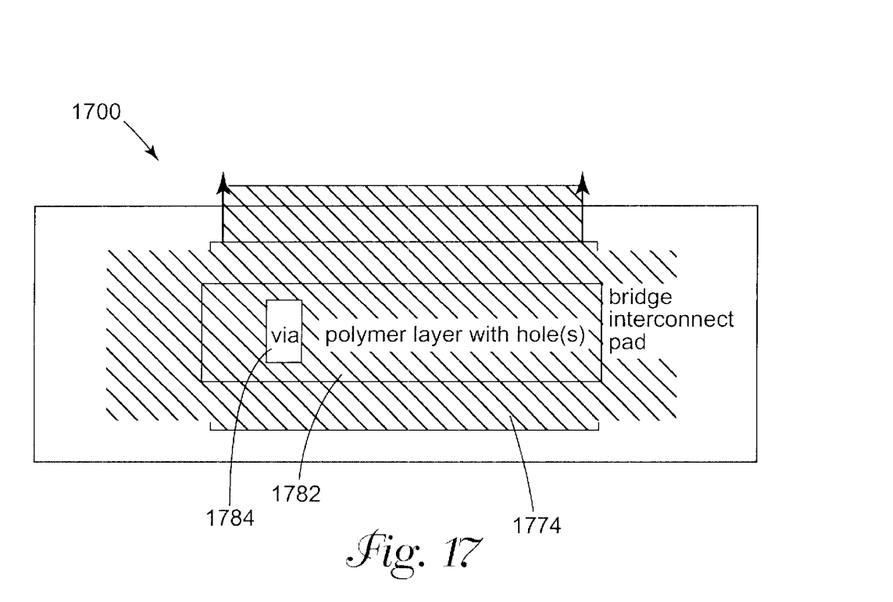
FIG. 17 illustrates a top wafer surface view of the structure after formation of the polymer membrane.

FIG. 17 illustrates a top wafer surface view 1700 of the structure after formation of the polymer membrane 1782. The polymer membrane 1782 is formed over the bridge 1774 and the second sacrificial layer (not visible in FIG. 17). The polymer membrane 1782 is shown having a void 1784 formed therein that is non-overlapping the bridge via (not visible in FIG. 17).

Figures 18, 19:
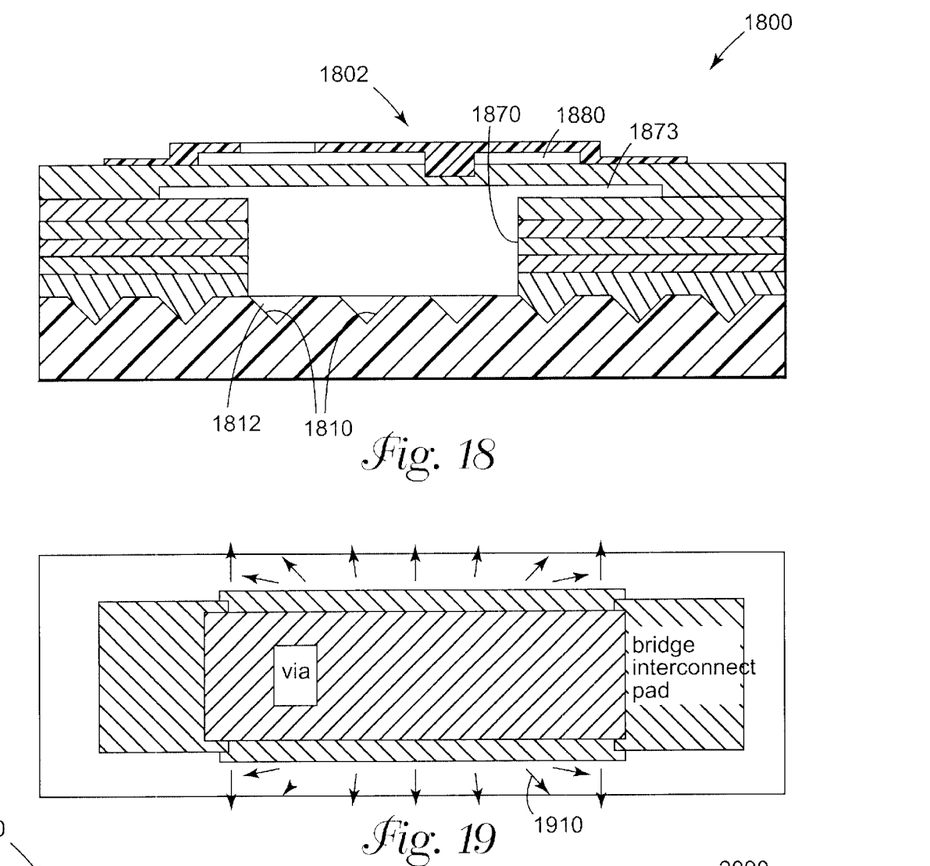
FIG. 18 illustrates the slider having the micromechanical valve according to the present invention after the removal of the sacrificial materials.
FIG. 19 illustrates a top wafer surface view of the structure showing the liftoff process that occurs through immersion of the wafer in a solvent.

FIG. 18 illustrates the slider 1800 having the micromechanical valve 1802 according to the present invention after the removal of the sacrificial materials, i.e., the first sacrificial material 1873, the second sacrificial material 1880, the sacrificial material 1872 in the via 1870, the bridge via 1876 and the sacrificial material in the air holes 1810. The removal of the sacrificial materials will occur simultaneously.

FIG. 19 illustrates a top wafer surface view 1900 of the structure showing the liftoff process that occurs through immersion of the wafer in a solvent. The dissolved material will escape 1910 through the first sacrificial layer. This material will move out from under the nickel/polycrystalline silicon bridge 1974. The etchant will dissolve the copper to create the air tubes while simultaneously dissolving the first sacrificial layer to open up the air hole vias. Both etchant paths will intersect in the bottom of the via or in an air tube, depending on design geometry.

Figure 20:
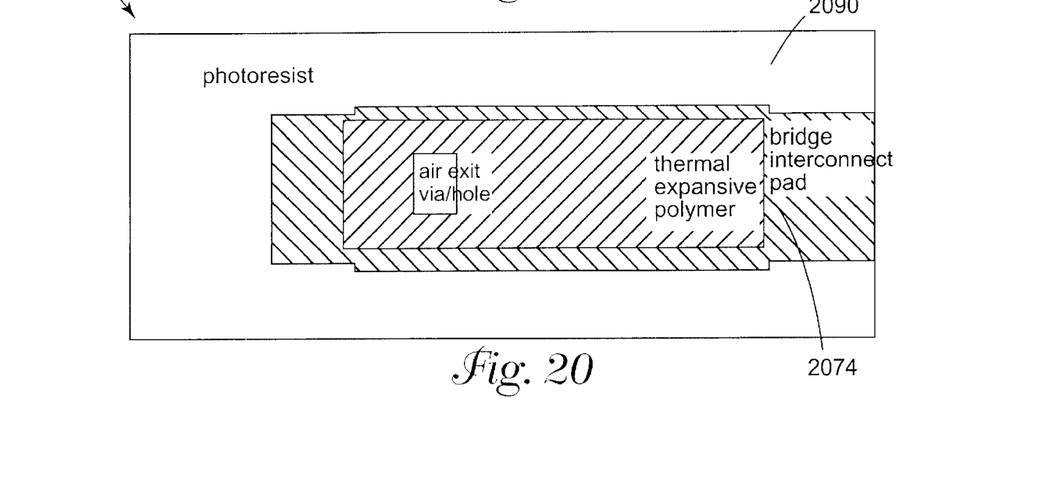
FIG. 20 illustrates a top wafer surface view of the structure showing the bridge being sealed with a sealing structure.

FIG. 20 illustrates a top wafer surface view 2000 of the structure showing the bridge 2074 being sealed with a sealing structure 2090. With the sacrificial material successfully extracted, the opening surrounding the bridge 2074 must be sealed. The edges of the bridge 2074 are sealed by one final photoresist deposition 2090.

Figure 21:
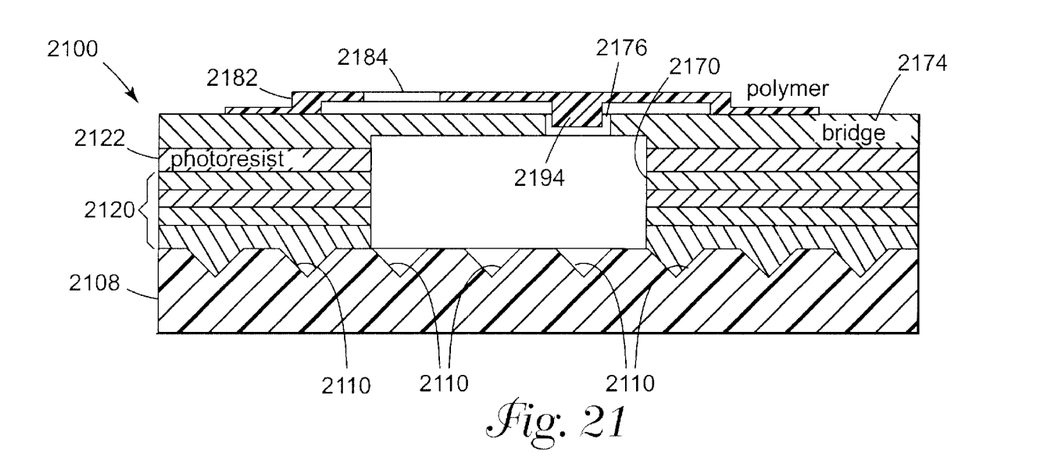
FIG. 21 illustrates the slider having the completed micromechanical valve formed according to the present invention with all openings sealed.

FIG. 21 illustrates the slider having the completed micromechanical valve formed according to the present invention with all openings sealed. FIG. 21 illustrates the substrate 2108 with air tubes 2110 formed therein. A plurality of layers 2120 are deposited to form the read/write element layers. An insulating layer 2114 is formed over the read/write element layers 2120. A conductor layer is deposited over the insulating layer 2114 to form the bridge 2174. A thermal expansive polymer 2182 is deposited over the bridge 2174. The thermal expansive polymer 2182 includes a void 2184 that leads to the bridge via 2176. The thermal expansive polymer 2182 provides a downward facing member 2194 that plugs the bridge via 2176 when the valve is closed to prevent air flow therebetween. When the valve is opened, the thermal expansive polymer 2182 moves further away from the bridge 2174 so that air flow can flow through the air tubes 2110 to the via 2170, through the bridge via 2176 and through the void 2184 in the thermal expansive polymer 2182. Those skilled in the art will recognize that the present invention is not meant to be limited to the particular structure shown in FIG. 21. Rather, those skilled in the art will recognize that the position of the thermal expansive polymer 2182 and the bridge 2174 could be reversed to provide an active micromechanical air valve according to the present invention. Alternatively, the thermal expansion coefficients could be chosen in any manner to allow separation of the bridge 2174 and the thermal expansive polymer 2182 upon application or removal of a control signal.

Figure 22:
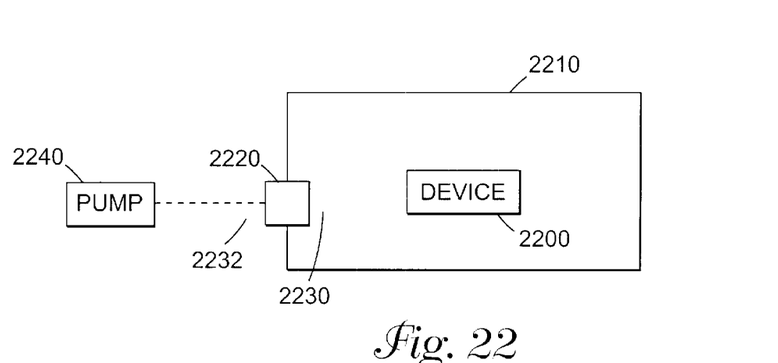
FIG. 22 illustrates a device disposed within an enclosure having an active micromechanical valve according to the present invention.

FIG. 22 illustrates a device 2200 disposed within an enclosure 2210. An active micromechanical air valve 2220 according to the present invention is provided for controlling the pressure within the enclosure. The micromechanical air valve 2220 controls the air flow between the inside 2230 and the outside 2232 of the enclosure. When the valve 2220 is activated, air will pass through the valve. However, those skilled in the art will recognize that the logic of the micromechanical air valve 2220 may be reverse so that air will flow when the valve 2220 is deactivated. Furthermore, an air pump 2240 may optionally be coupled to the micromechanical air valve 2220 to compensate for environmental changes within the enclosure 2210.

In summary, the present invention provides an active micromechanical air valve for fly height control of an air bearing slider and method for making the same. The present invention uses a bridge material that is formed of more than one material. The process of forming the active micromechanical air valve for fly height control of an air bearing slider meets the overall dimensional requirements. This is accomplished through the addition of electrical pads at the ends of the bridge that will heat up quickly causing a thermo-mechanical deflection of a polymer membrane. The micromechanical air valve controls the air flow to the ABS, thus altering the fly height. When the valve is activated, air will pass through the valve and down etched air tubes that are open to the ABS. However, those skilled in the art will recognize that the logic of device may be reverse so that air will flow when the valve is deactivated.

Similarly, said valve can be attached to DASD enclosure surface that can control air flow to and from the drive. Said air tubes can flow to the environment or air pump structure. This configuration could alter the pressure in the drive to compensate for environmental changes or longer read/write activity (greater than 1 second).

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An active micromechanical air valve for providing pressure control, comprising:

a first layer having a first thermal coefficient of expansion;

a second layer having a second thermal coefficient of expansion;

wherein the first layer and the second layer are configured to form a membrane, the first and second layer engaging in a closed state to prevent air flow therebetween in a first thermal state and opening to allow air flow therebetween in a second thermal state.

2. The active micromechanical air valve of claim 1 wherein the first thermal state is achieved by the absence of a control signal.

3. The active micromechanical air valve of claim 2 wherein the control signal is a drive current from a current source.

4. The active micromechanical air valve of claim 1 wherein the second thermal state is achieved by application of a control signal.

5. The active micromechanical air valve of claim 4 wherein the control signal is a drive current from a current source.

6. The active micromechanical air valve of claim 1 wherein the first layer is a conductive layer forming a bridge layer for conducting a drive current applied to the conductive layer.

7. The active micromechanical air valve of claim 6 wherein the first layer further comprises a nickel bridge.

8. The active micromechanical air valve of claim 7 wherein the nickel bridge further comprises a resistive, low stress insulating material sputtered thereon and a doped layer of polycrystalline silicon for providing an electrical resistive layer.

9. The active micromechanical air valve of claim 7 wherein the second layer further comprises a thermal expansive polymer.

10. The active micromechanical air valve of claim 1 wherein the second layer further comprises a first opening and a downward facing member and the first layer comprises a second opening, the second opening of the first layer offset from the first opening in the second layer and the downward facing member plugging the second opening in the first layer when the first and second layer engage in the closed state to prevent air flow therebetween in the first thermal state.

\* \* \* \* \*